(12) United States Patent
Zhang

(10) Patent No.: US 11,267,400 B2
(45) Date of Patent: Mar. 8, 2022

(54) AUGMENTED SOLAR-POWERED EMERGENCY VEHICLE LIGHT

(71) Applicant: YUYAO DECHENG TECHNOLOGY CONSULTING CO., LTD., Yuyao (CN)

(72) Inventor: Shanqin Zhang, Yuyao (CN)

(73) Assignee: Yuyao Decheng Technology Consulting CO., LTD., Yuyao (CN)

( * ) Notice: Subject to any disclaimer, the term of this patent is extended or adjusted under 35 U.S.C. 154(b) by 279 days.

(21) Appl. No.: 16/618,861

(22) PCT Filed: Jun. 30, 2017

(86) PCT No.: PCT/CN2017/091143
§ 371 (c)(1),
(2) Date: Dec. 3, 2019

(87) PCT Pub. No.: WO2018/223450
PCT Pub. Date: Dec. 13, 2018

(65) Prior Publication Data
US 2021/0078493 A1     Mar. 18, 2021

(30) Foreign Application Priority Data
Jun. 6, 2017   (CN) .......................... 201710418093.3

(51) Int. Cl.
*B60Q 7/00*      (2006.01)
*B60Q 1/52*      (2006.01)
(Continued)

(52) U.S. Cl.
CPC ............. *B60Q 7/00* (2013.01); *B60Q 1/52* (2013.01); *F21K 2/08* (2013.01); *F21S 9/037* (2013.01);
(Continued)

(58) Field of Classification Search
None
See application file for complete search history.

(56) References Cited

U.S. PATENT DOCUMENTS

| 2002/0071268 A1* | 6/2002 | Pederson | B60Q 7/00 362/35 |
| 2015/0175052 A1* | 6/2015 | Gergets | B60Q 1/0094 362/542 |

FOREIGN PATENT DOCUMENTS

| CN | 200620110916 | 7/2006 |
| CN | 200986730 | 12/2007 |

(Continued)

OTHER PUBLICATIONS

International Search Report issued for PCT/CN2017/091143, dated Feb. 26, 2018.

*Primary Examiner* — Anh Q Tran
(74) *Attorney, Agent, or Firm* — Thomas|Horstemeyer LLP

(57) ABSTRACT

An expanded solar alarm lamp includes a solar cell component, a solar battery, a main controller, a xenon tube lamp, a circuit board, and a PC housing. The solar battery is connected to the solar cell component for receiving solar energy from the solar cell component and storing the solar energy to a battery that supplies electric power to the alarm lamp. The main controller and xenon tube lamp are installed on the circuit board; the PC housing is used for wrapping the circuit board and installed at the top of a car body; the xenon tube lamp is for generating a warning light; and the main controller is for determining whether the electric power supply is provided by the solar battery which is the xenon tube lamp based on the current stored electricity of the solar battery. The invention improves the performance and function of the solar alarm lamp.

3 Claims, 2 Drawing Sheets

(51) Int. Cl.
  *F21K 2/08*       (2006.01)
  *F21S 9/03*       (2006.01)
  *H05B 47/125*     (2020.01)
  *H05B 47/19*      (2020.01)
  *F21W 103/00*     (2018.01)
  *F21Y 103/00*     (2016.01)

(52) U.S. Cl.
  CPC ........... *H05B 47/125* (2020.01); *H05B 47/19* (2020.01); *B60Q 2900/30* (2013.01); *F21W 2103/00* (2018.01); *F21Y 2103/00* (2013.01)

(56) References Cited

FOREIGN PATENT DOCUMENTS

| | | |
|---|---|---|
| CN | 201020504301 | 8/2010 |
| CN | 201829005 | 5/2011 |
| CN | 201120185468 | 6/2011 |
| CN | 202165980 | 3/2012 |
| CN | 201510162660 | 4/2015 |
| CN | 104732766 | 6/2015 |
| CN | 201620411614 | 5/2016 |
| CN | 205553927 | 9/2016 |
| JP | 3188119 | 1/2014 |

\* cited by examiner

AUGMENTED SOLAR-POWERED EMERGENCY VEHICLE LIGHT

FIELD OF THE INVENTION

The present invention relates to the field of solar alarm lamps, and more particularly to an expanded solar alarm lamp.

BACKGROUND OF THE INVENTION

Special vehicles such as police cars, fire engines, ambulances, etc. are not restricted by traffic lights and may drive the wrong way when using a siren in a mission, and surrounding pedestrians and vehicles are obligated to give way timely. However, the premise is to have the siren legally installed and issued, otherwise these vehicles will be punished theoretically. This is the legal and responsibility privilege of these special vehicles.

In addition, police cars have to turn on the siren during the process of handling emergency cases, and the siren not just clears the way for the police cars to get to the crime scene in the first time only, but also provides a deterrent effect to scare a criminal suspect away. In the event of an emergency, there is no warning in advance, and the police officer only has a response plan for the emergency, but no specific action plan. In other words, the police car rushes to the crime scene to rescue victims or handling the emergency situation. The main purpose is to minimize the damage, rather than blindly arresting the criminal suspect.

For example, when a police command center receives a call on arm robbery, the police officer on a police patrol car cannot sneak near to the suspect and arrest the suspect. The criminal suspect may run away before the police officer gets close to the criminal suspect, or the criminal suspect has already killed the victim. Obviously, it is not worthy to arrest the suspect by such a high price. Therefore, an alarm lamp with a siren can be used to scare away the criminal suspect in order to stop the crime and protect the victim's life and property. Even though the level of difficulty of seizing the criminal suspect afterward has increased naturally, it is much better than scarifying the life of an innocent person.

When the traffic congestion occurred in the neighborhood of a conventional alarm lamp changes, the flash frequency of the alarm lamp still remains unchanged and cannot be set to a corresponding flash mode according to road conditions, and it is easy to lead to low efficiency and delay in reaching the destination of the emergency.

SUMMARY OF THE INVENTION

Therefore, it is a primary objective of the present invention to overcome the aforementioned drawbacks of the prior art by providing an expanded solar alarm lamp capable of dividing a plurality of vehicle sub-images from an image based on a predetermined vehicle profile characteristic, determining the current vehicle congestion based on the quantity of the plurality of vehicle sub-images, searching a flash frequency corresponding to the current vehicle congestion based on the density-frequency conversion table and using the flash frequency as a target flash frequency, and sending the target flash frequency to the xenon tube lamp to drive the xenon tube lamp to flash according to the target flash frequency.

To achieve the aforementioned and other objectives, the present invention provides an expanded solar alarm lamp, comprising: a solar cell component, a solar battery, a main controller, a xenon tube lamp, a circuit board, and a PC housing, the solar cell component for receiving solar energy, characterized in that the solar battery is coupled to the solar cell component for storing solar energy received by the solar cell component and providing the solar energy as an electric power supply to the alarm lamp, and the main controller and the xenon tube lamp are installed on the circuit board, and the PC housing is used for wrapping the circuit board and installed to the top of a car body, and the xenon tube lamp is provided for generating a warning light.

Wherein, the main controller is coupled to the solar battery and the xenon tube lamp for determining whether or not the electric power supply provided by the solar battery is from the xenon tube lamp based on the current stored electricity of the solar battery.

In the expanded solar alarm lamp, the process of the main controller determining whether or not the electric power supply provided by the solar battery is from the xenon tube lamp based on the current stored electricity includes: if the current stored electricity of the solar battery is greater than or equal to a predetermined electricity threshold, then the solar battery will replace the vehicle power supply to the xenon tube lamp for providing the electric power supply.

In the expanded solar alarm lamp, the process of the main controller determining whether or not the electric power supply provided by the solar battery is from the xenon tube lamp based on the current stored electricity includes: if the current stored electricity of the solar battery is smaller than the predetermined electricity threshold, then the solar battery will replace the vehicle power supply to the xenon tube lamp for providing the electric power supply.

Specifically, the expanded solar alarm lamp further comprises a lens element installed between the xenon tube lamp and the PC housing for concentrating and transmitting the light emitted from the xenon tube lamp to the outside uniformly.

Specifically, the expanded solar alarm lamp further comprises:

a TF storage card, installed in the front-end dashboard of the vehicle, for storing a congestion-frequency conversion table and an image filtering template library, and the density-frequency conversion table using the vehicle congestion as an index to save a flash frequency corresponding to each vehicle congestion;

an image capturing device, installed at the top of a car body, for performing an image data capture of a vehicle nearby to obtain a vehicle's surrounding image;

an initial filtering device, coupled to the image capturing device, for receiving the vehicle's surrounding image to execute a wavelet filtering, a Wiener filtering, a median filtering and a Gaussian low-pass filtering of the vehicle's surrounding image simultaneously to obtain a first filtered image, a second filtered image, a third filtered image and a fourth filtered image respectively, while performing a signal-to-noise ratio analysis of the first filtered image, the second filtered image, the third filtered image and the fourth filtered image to obtain a first signal-to-noise ratio, a second signal-to-noise ratio, a third signal-to-noise ratio and a fourth signal-to-noise ratio respectively, and the signal-to-noise ratio with the largest value is selected from the four signal-to-noise ratios as a target signal-to-noise ratio, and the filtered image corresponding to the target signal-to-noise ratio being used as a target filtered image;

a signal analysis processing device, coupled to the initial filtering device, for performing a noise component analysis of the target filtered image to obtain different types of noises in the target filtered image, and each noise signal component, and three noise signal components with the three largest amplitudes being selected in each noise signal component and arranged according to a descending order of the amplitudes as a first noise signal component, a second noise signal component and a third noise signal component, and image filter templates corresponding to the first noise signal component, the second noise signal component and the third noise signal component being searched from the image filtering template library as a first filter template, a second filter template and a third filter template respectively, and the first filter template, the second filter template and the third filter template being used sequentially to perform a filtering of the filtered images to obtain a final filtered image;

a congestion detection device, coupled to the signal analysis processing device, for receiving the final filtered image, based on predetermined vehicle profile characteristic, dividing the final filtered image into a plurality of vehicle sub-images, and determining the current vehicle congestion based on the quantity of the plurality of vehicle sub-images; and the main controller being coupled to the TF storage card, the congestion detection device and the xenon tube lamp, for receiving the current vehicle congestion, searching a flash frequency corresponding to the current vehicle congestion based on the density-frequency conversion table, using the flash frequency as a target flash frequency, and sending the target flash frequency to the xenon tube lamp to drive the xenon tube lamp to flash according to the target flash frequency.

Specifically, the expanded solar alarm lamp further comprises a wireless communication interface coupled to the main controller for sending the received current vehicle congestion to a remote traffic control center.

Specifically, the expanded solar alarm lamp further comprises a Bei Dou navigation satellite system device installed in the front-end dashboard of the vehicle for detecting and outputting a vehicle's current navigation position Wherein, the wireless communication interface is coupled to the Bei Dou navigation satellite system device for sending the current vehicle congestion and the vehicle's current navigation position to the remote traffic control center altogether.

In the expanded solar alarm lamp, the solar cell component comprises a photovoltaic panel and a voltage conversion device, and the photovoltaic panel is provided for receiving solar energy and outputting a voltage signal, and the voltage conversion device is coupled to the photovoltaic panel for converting the voltage signal outputted by the photovoltaic panel into each voltage value required by the alarm lamp.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

As the name of alarm lamp suggests, the alarm lamp provides a warning effect and it is generally used for maintaining road safety, reducing traffic accidents effectively, and preventing potential danger. In general, the alarm lamp is used extensively for the development of police cars, engineering cars, fire engines, ambulances, accident prevention and control cars, road maintenance cars, tractors, emergency A/S cars, and mechanical devise.

In general, alarm lamps with different lengths are provided for the purpose of fitting various car models and applications, and there are structures with a lampshade assembly and a color combination applied to the lampshade on a side if needed. In addition, the alarm lamp may be divided according to the form of light source into a rotating bulb lamp, an LED flash lamp, and a Xenon strobe tube lamp, wherein the LED flash form is an upgraded version of the rotating bulb lamp with longer service life, better power saving, and lower heat generation.

The alarm lamp has significant effects when it is used in the following situations. For example, it is necessary for a construction unit to light up an alarm lamp during a road construction, particularly in the dark conditions at night, since accidents may occur or people unfamiliar with the conditions may be tripped easily. These may also lead to a traffic jam. Obviously, it is necessary and mandatory to set up the alarm lamp for road construction. Secondly, the alarm lamp is also applied to driving on a road, and it is very common to have problems in long-time driving occasionally. In case of requiring to stop a car on the road, drivers need to place a danger alarm lamp to remind passing vehicles to notice the obstacle in front, slow down, and drive safely. The alarm lamp with good performance can expand the visible range of a danger warning sign and let other drivers to see the sign more clearly. Therefore, the alarm lamp with good performance should be used as much as possible.

However, the flash frequency of present alarm lamps is fixed and cannot be changed according to traffic flow, so that when the traffic is heavy, the frequent flashing method cannot be used to effectively alert and remind approaching cars at a predetermined distance ahead, and this will reduce the driving speed of the police car. To overcome the aforementioned deficiency, the present invention provides an expanded solar alarm lamp to overcome the deficiency of the prior art.

Figure 1:
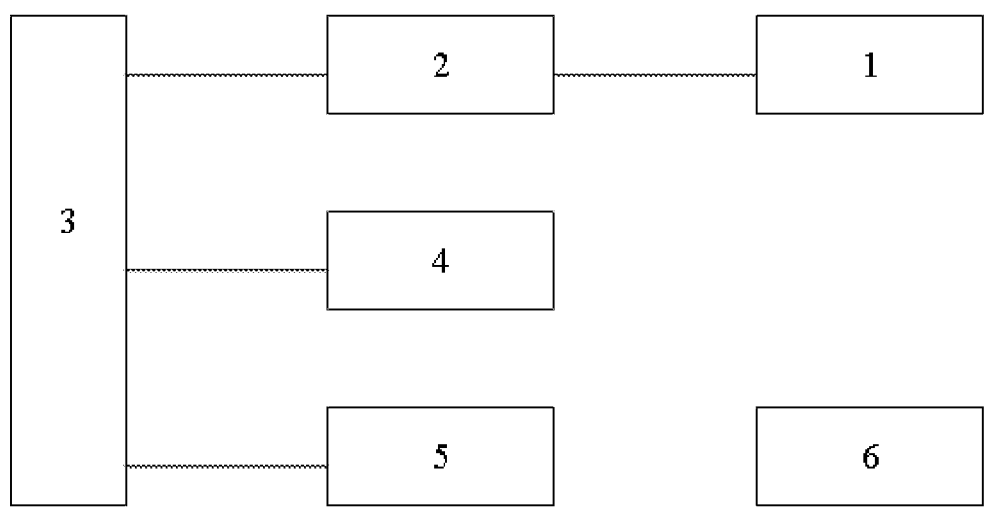
FIG. 1 is a structural block diagram of an expanded solar alarm lamp in accordance with an embodiment of the present invention.

With reference to FIG. 1 for a structural block diagram of an expanded solar alarm lamp in accordance with an embodiment of the present invention, the expanded solar alarm lamp comprises a solar cell component, a solar battery, a main controller, a xenon tube lamp, a circuit board and a PC housing, wherein the solar cell component is provided for receiving solar energy, and the solar battery is coupled to the solar cell component for storing the solar energy received by the solar cell component and providing the solar energy as an electric power supply to the alarm lamp, and the main controller and the xenon tube lamp are installed on the circuit board, and the PC housing is used for wrapping the circuit board and installed at the top of a car body, and the xenon tube lamp is provided for generating a warning light.

Wherein, the main controller is coupled to the solar battery and the xenon tube lamp for determining whether or not the electric power supply provided by the solar battery is from the xenon tube lamp based on the current stored electricity of the solar battery.

The specific structure of the expanded solar alarm lamp of the present invention is described below.

In the expanded solar alarm lamp, the process of the main controller determining whether or not the electric power supply provided by the solar battery is from the xenon tube lamp based on the current stored electricity of the solar battery based on the current stored electricity of the solar battery includes: if the current stored electricity of the solar battery is greater than or equal to a predetermined electricity threshold, then the solar battery will replace the vehicle power supply to the xenon tube lamp for providing the electric power supply.

In the expanded solar alarm lamp, the process of the main controller determining whether or not the electric power supply provided by the solar battery is from the xenon tube lamp based on the current stored electricity includes: if the current stored electricity of the solar battery is smaller than the predetermined electricity threshold, then the solar battery will replace the vehicle power supply to the xenon tube lamp for providing the electric power supply.

The expanded solar alarm lamp further comprises a lens element installed between the xenon tube lamp and the PC housing for concentrating and transmitting the light emitted from the xenon tube lamp to the outside uniformly.

Figure 2:
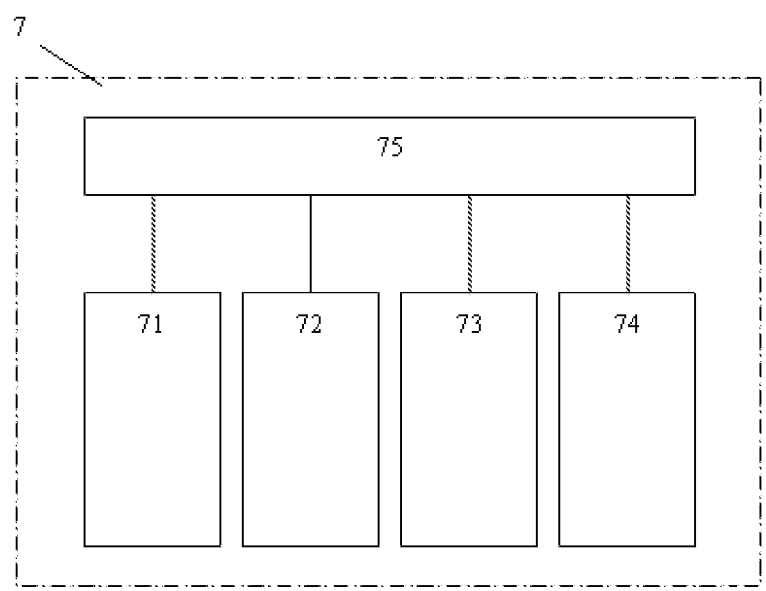
FIG. 2 is a structural block diagram of an initial filtering device of an expanded solar alarm lamp in accordance with an embodiment of the present invention.

The expanded solar alarm lamp further comprises the following elements:

a TF storage card, installed in the front-end dashboard of the vehicle, for storing a congestion-frequency conversion table and an image filtering template library, and the density-frequency conversion table using the vehicle congestion as an index to save a flash frequency corresponding to each vehicle congestion;

an image capturing device, installed at the top of a car body, for performing an image data capture of a vehicle nearby to obtain a vehicle's surrounding image;

an initial filtering device, coupled to the image capturing device, for receiving the vehicle's surrounding image to execute a wavelet filtering, a Wiener filtering, a median filtering and a Gaussian low-pass filtering of the vehicle's surrounding image simultaneously to obtain a first filtered image, a second filtered image, a third filtered image and a fourth filtered image respectively, while performing a signal-to-noise ratio analysis of the first filtered image, the second filtered image, the third filtered image and the fourth filtered image to obtain a first signal-to-noise ratio, a second signal-to-noise ratio, a third signal-to-noise ratio and a fourth signal-to-noise ratio respectively, and the signal-to-noise ratio with the largest value is selected from the four signal-to-noise ratios as a target signal-to-noise ratio, and the filtered image corresponding to the target signal-to-noise ratio being used as a target filtered image;

wherein, the initial filtering device as shown in FIG. 2 comprises a wavelet filtering unit, a Wiener filtering unit, a median filtering unit, a Gaussian low-pass filtering unit, and a target chart selection unit.

a signal analysis processing device, coupled to the initial filtering device, for performing a noise component analysis of the target filtered image to obtain different types of noises in the target filtered image, and each noise signal component, and three noise signal components with the three largest amplitudes being selected in each noise signal component and arranged according to a descending order of the amplitudes as a first noise signal component, a second noise signal component and a third noise signal component, and image filter templates corresponding to the first noise signal component, the second noise signal component and the third noise signal component being searched from the image filtering template library as a first filter template, a second filter template and a third filter template respectively, and the first filter template, the second filter template and the third filter template being used sequentially to perform a filtering of the filtered images to obtain a final filtered image;

a congestion detection device, coupled to the signal analysis processing device, for receiving the final filtered image, based on predetermined vehicle profile characteristic, dividing the final filtered image into a plurality of vehicle sub-images, and determining the current vehicle congestion based on the quantity of the plurality of vehicle sub-images.

The main controller is coupled to the TF storage card, the congestion detection device and the xenon tube lamp are provided for receiving the current vehicle congestion, searching a flash frequency corresponding to the current vehicle congestion based on the density-frequency conversion table, using the flash frequency as a target flash frequency, and sending the target flash frequency to the xenon tube lamp to drive the xenon tube lamp to flash according to the target flash frequency.

The expanded solar alarm lamp further comprises a wireless communication interface coupled to the main controller for sending the received current vehicle congestion to a remote traffic control center.

The expanded solar alarm lamp further comprises a Bei Dou navigation satellite system device installed in the front-end dashboard of the vehicle for detecting and outputting a vehicle's current navigation position.

Wherein, the wireless communication interface is coupled to the Bei Dou navigation satellite system device for sending the current vehicle congestion and the vehicle's current navigation position to the remote traffic control center altogether.

In the expanded solar alarm lamp, the solar cell component comprises a photovoltaic panel and a voltage conversion device, and the photovoltaic panel is provided for receiving solar energy and outputting a voltage signal, and the voltage conversion device is coupled to the photovoltaic panel for converting the voltage signal outputted by the photovoltaic panel into each voltage value required by the alarm lamp.

Wherein, the wireless communication interface is achieved by a time division duplex (TTD) device. Time Division Duplex (TDD) is a duplex method for communication systems, such as a mobile communication system for separating the receiving and transmitting channels. The mobile communication tends to be developed in the third generation, China submitted a draft of a third-generation communication standard (TD-SCDMA) in June 1997, and the features of the TDD mode and smart antenna of the new technology are highly rates and the TD-SCDMA standard becomes one of the three major candidate standards. The FDD mode of the first-generation and second-generation mobile communication systems unified the world, and the TDD mode did not attract much attention at the beginning. With new businesses requirements and new technological developments and many advantages of the TDD mode, the TDD mode is catching more and more attention.

The operating principle of the time division duplex is described below: TDD is a duplex method of a communication system, and used in a mobile communication system for separating the receiving and transmitting channels (uplink of downlink). In a mobile communication system of the TDD mode, receiving and transmission are taken place in the same frequency channel (which is in a different timeslot of a carrier wave) to use time to separate the receiving and transmitting channels. In a mobile communication system of the FDD mode, the receiving and transmission are taken place in two separate symmetrical frequency channels to use frequency band to separate the receiving and transmitting channels.

The features and communication benefits of the mobile communication systems adopting different duplex modes are different. The uplink and downlink channels of the mobile communication systems of the TDD mode use the same frequency, and thus have the reciprocity of the uplink and downlink channels, and it brings many advantages to the mobile communication systems of the TDD mode.

In the TDD mode, the transmission of uplink and downlink information can be done in the same wave carrier frequency. In other words, the transmission of the uplink information and the transmission of the downlink information can be achieved in the same carrier wave through time division.

The expanded solar alarm lamp of the present invention aims at the technical issue that the conventional alarm lamp cannot adjust its flash frequency according to the traffic flow to integrate a plurality of customized image processing devices into the hardware resource of the present existing alarm lamps and collect the information of the traffic flow, so as to flexibly change the flash frequency of the alarm lamp based on the current vehicle conditions and adopt a plurality of solar power supply components to achieve the effect of supplying power to the alarm lamp continuously to improve the reliability of the alarm lamp.

While the present invention has been described by means of specific embodiments, numerous modifications and variations could be made thereto by those skilled in the art without departing from the scope and spirit of the present invention set forth in the claims.

What is claimed is:

1. An expanded solar alarm lamp, comprising a solar cell component, a solar battery, a main controller, a xenon tube lamp, a circuit board and a PC housing, and the solar cell component being provided for receiving solar energy, and the solar battery being coupled to the solar cell component for storing the solar energy received by the solar cell component and providing the solar energy as an electric power supply to the alarm lamp, and the main controller and the xenon tube lamp being installed on the circuit board, and the PC housing being used for wrapping the circuit board and installed at the top of a car body, and the xenon tube lamp being provided for generating a warning light;

wherein the main controller is coupled to the solar battery and the xenon tube lamp for determining whether or not the electric power supply provided by the solar battery is from the xenon tube lamp based on the current stored electricity of the solar battery;

the process of the main controller determining whether or not the electric power supply provided by the solar battery is from the xenon tube lamp based on the current stored electricity includes: if the current stored electricity of the solar battery is greater than or equal to a predetermined electricity threshold, then the solar battery will replace the vehicle power supply to the xenon tube lamp for providing the electric power supply;

the process of the main controller determining whether or not the electric power supply provided by the solar battery is from the xenon tube lamp based on the current stored electricity includes: if the current stored electricity of the solar battery is smaller than the predetermined electricity threshold, then the solar battery will replace the vehicle power supply to the xenon tube lamp for providing the electric power supply;

a lens element installed between the xenon tube lamp and the PC housing for concentrating and transmitting the light emitted from the xenon tube lamp to the outside uniformly;

a TF storage card, installed in the front-end dashboard of the vehicle, for storing a congestion-frequency conversion table and an image filtering template library, and the density-frequency conversion table using the vehicle congestion as an index to save a flash frequency corresponding to each vehicle congestion;

an image capturing device, installed at the top of a car body, for performing an image data capture of a vehicle nearby to obtain a vehicle's surrounding image;

an initial filtering device, coupled to the image capturing device, for receiving the vehicle's surrounding image to execute a wavelet filtering, a Wiener filtering, a median filtering and a Gaussian low-pass filtering of the vehicle's surrounding image simultaneously to obtain a first filtered image, a second filtered image, a third filtered image and a fourth filtered image respectively, while performing a signal-to-noise ratio analysis of the first filtered image, the second filtered image, the third filtered image and the fourth filtered image to obtain a first signal-to-noise ratio, a second signal-to-noise ratio, a third signal-to-noise ratio and a fourth signal-to-noise ratio respectively, and the signal-to-noise ratio with the largest value is selected from the four signal-to-noise ratios as a target signal-to-noise ratio, and the filtered image corresponding to the target signal-to-noise ratio being used as a target filtered image;

a signal analysis processing device, coupled to the initial filtering device, for performing a noise component analysis of the target filtered image to obtain different types of noises in the target filtered image, and each noise signal component, and three noise signal components with the three largest amplitudes being selected in each noise signal component and arranged according to a descending order of the amplitudes as a first noise signal component, a second noise signal component and a third noise signal component, and image filter templates corresponding to the first noise signal component, the second noise signal component and the third noise signal component being searched from the image filtering template library as a first filter template, a second filter template and a third filter template respectively, and the first filter template, the second filter template and the third filter template being used sequentially to perform a filtering of the filtered images to obtain a final filtered image;

a congestion detection device, coupled to the signal analysis processing device, for receiving the final filtered image, based on predetermined vehicle profile characteristic, dividing the final filtered image into a plurality of vehicle sub-images, and determining the current vehicle congestion based on the quantity of the plurality of vehicle sub-images;

the main controller being coupled to the TF storage card, the congestion detection device and the xenon tube lamp, for receiving the current vehicle congestion, searching a flash frequency corresponding to the current vehicle congestion based on the density-frequency conversion table, using the flash frequency as a target flash frequency, and sending the target flash frequency to the xenon tube lamp to drive the xenon tube lamp to flash according to the target flash frequency; and a wireless communication interface coupled to the main controller for sending the received current vehicle congestion to a remote traffic control center.

2. The expanded solar alarm lamp according to claim 1, further comprising a Bei Dou navigation satellite system device installed in the front-end dashboard of the vehicle for detecting and outputting a vehicle's current navigation position; wherein the wireless communication interface is coupled to the Bei Dou navigation satellite system device for sending the current vehicle congestion and the vehicle's current navigation position to the remote traffic control center altogether.

3. The expanded solar alarm lamp according to claim 2 wherein the solar cell component comprises a photovoltaic panel and a voltage conversion device, and the photovoltaic panel is provided for receiving solar energy and outputting a voltage signal, and the voltage conversion device is coupled to the photovoltaic panel for converting the voltage signal outputted by the photovoltaic panel into each voltage value required by the alarm lamp.

\* \* \* \* \*